United States Patent [19]

Shepard

[11] 4,370,087
[45] Jan. 25, 1983

[54] DUMPING APPARATUS FOR PARTICULATE-BEARING CONTAINER
[75] Inventor: James N. Shepard, Clayton, Calif.
[73] Assignee: United States Steel Corporation, Pittsburgh, Pa.
[21] Appl. No.: 206,581
[22] Filed: Nov. 13, 1980
[51] Int. Cl.³ .............................................. B65G 65/34
[52] U.S. Cl. ..................................... 414/421; 222/559
[58] Field of Search ...................... 414/421, 420, 642; 222/166, 561, 559; 248/140–142; 198/486, 409

[56] References Cited
U.S. PATENT DOCUMENTS

| | | | |
|---|---|---|---|
| 2,184,227 | 12/1939 | Rueger | 222/559 X |
| 3,662,910 | 5/1972 | Herpich et al. | 414/421 X |
| 3,730,365 | 5/1973 | Herpich et al. | 414/421 X |
| 3,978,999 | 9/1976 | Ryder | 414/421 |
| 4,018,351 | 4/1977 | Stobb | 414/421 |
| 4,095,707 | 6/1978 | Kowtko | 414/421 X |
| 4,278,386 | 7/1981 | Eranosian | 414/421 |

Primary Examiner—Andres Kashnikow
Assistant Examiner—L. E. Williams
Attorney, Agent, or Firm—John F. Carney

[57] ABSTRACT

Mechanical dumping apparatus is described that is adapted for use in a zinc powder galvanizing system. The apparatus is effective to confine the powder during the dumping operation in order to minimize operator exposure to the harmful effects thereof. Mechanism provided for inverting the container includes a lid closure device incorporating a slide gate for controllably discharging the contents of the container when in its inverted mode.

5 Claims, 4 Drawing Figures

DUMPING APPARATUS FOR PARTICULATE-BEARING CONTAINER

BACKGROUND OF THE INVENTION

U.S. Pat. No. 4,111,154 discloses apparatus for the treatment of sheet iron emerging from a galvanization bath in order to reduce the "spangle" produced on the sheet surface. The apparatus utilizes finely divided zinc particles or powder that is dispensed from a hopper in an air stream through spray nozzles onto a moving sheet surface. Continuous operation of the apparatus requires the periodic loading of the hopper with zinc powder. When the hopper-loading operation is conducted manually not only does a workman have the arduous task of lifting and dumping heavily weighted containers of powder but he also is exposed to the possibility of inhaling the dust particles that permeate the loading area.

It is to the amelioration of the above problem that the present invention is directed.

SUMMARY OF THE INVENTION

The invention accordingly involves mechanical apparatus particularly adaped for dumping containers bearing finely divided particulate materials such as zinc powder in which the apparatus comprises a stationary base, a frame journalled for rotating movement with respect to said base, means on said frame for releasably securing an open-ended container thereto, a container closure movably mounted on said frame, means for releasably connecting said closure to the open end of a container secured to said frame, said closure including a plate having a solid portion and an opening laterally spaced therefrom slidable in said closure, and means for sliding said plate with respect to said closure to alternately position said solid portion or said opening with respect to the open end of said container, and means for pivoting said frame alternately between a loading position in which said container is upstanding and a discharge position in which said container is inverted.

It is therefore a principle object of the invention to provide mechanical apparatus that will alleviate a workman's arduous task of lifting and dumping heavy containers of fine powder.

It is also an object of the invention to provide apparaus for dumping fine powder in a manner as to effectively isolate the powder within the container during the dumping operation so as to eliminate a workman's exposure to an unhealthy, dust particle-laden work area.

For a better understanding of the invention, its operating advantages and the specific objectives obtained by its use, reference should be made to the accompanying drawings and description which relate to a preferred embodiment thereof.

DESCRIPTION OF A PREFERRED EMBODIMENT OF THE INVENTION

Figure 1:
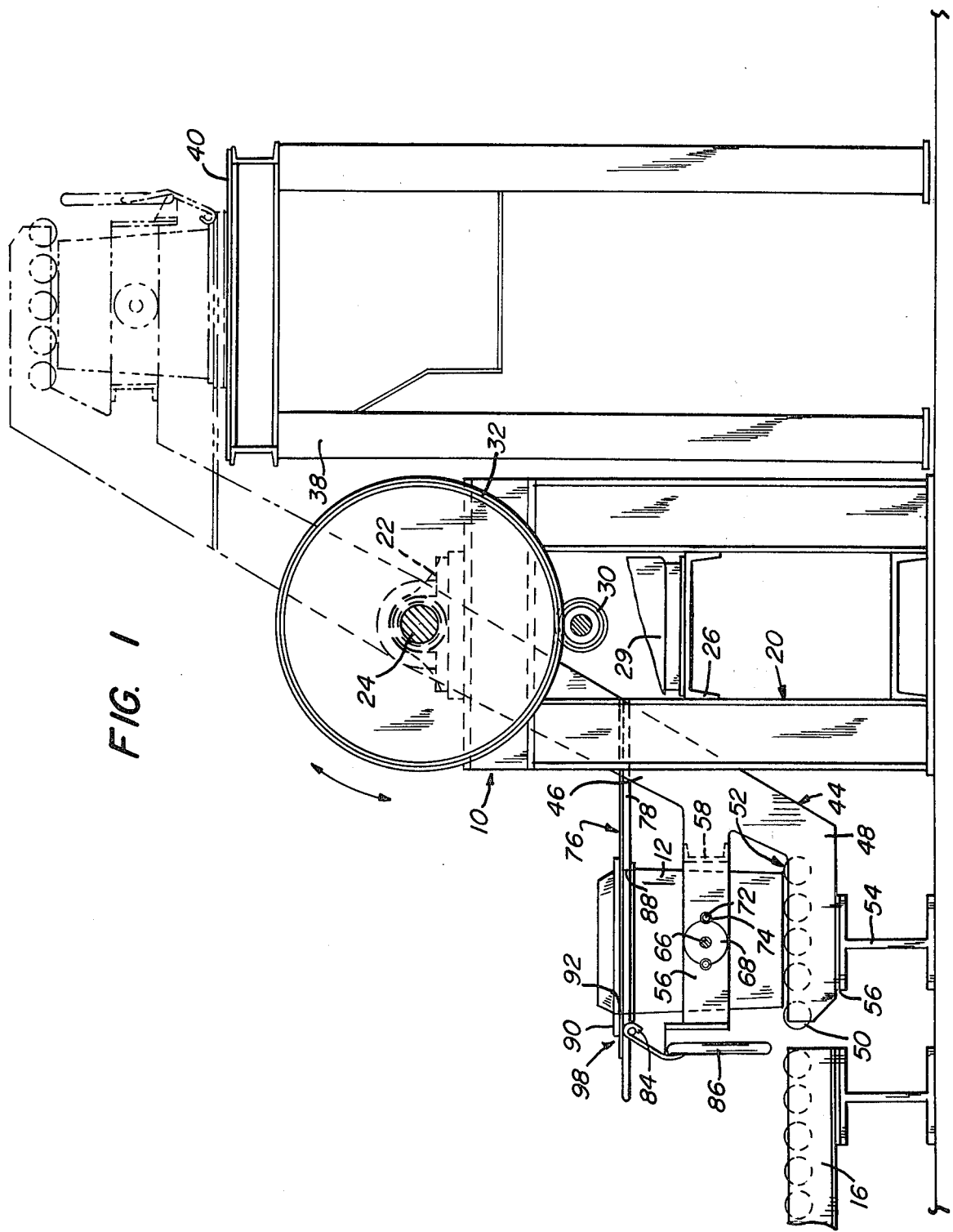
FIG. 1 is an elevational view of the dumping apparatus of the present invention shown in the loading position and including a representation in phantom lines of the apparatus in the dumping mode.

The drawing figures depict dumping apparatus 10 utilized in a loading operation for transferring finely divided powder in containers 12 from the discharge end of a transport conveyor 16 to an elevated hopper 18 as, for example, forms part of the galvanized sheet surface control system described in U.S. Pat. No. 4,111,154. It should be understood however that the dumping apparatus 10 described herein is equally applicable in other operations in which it is desired to transfer harmful dust-producing powders from containers to a receiver.

The dumping apparatus 10 includes structural members forming a stationary base 20 on the upper portion of which are mounted laterally spaced pillow blocks 22 for journalling the opposite ends of a rotary drive shaft 24. An extension member 26 from the base 20 seats a reversible motor 28 operative through gear reducer 29, pinion 30 and drive gear 32 to drive the shaft 24 selectively forwardly or backwardly between limits determined by limit switches 33 and 34 actuated by an actuator arm 35 on the drive shaft for transferring a container 12 to the hopper 18, the latter being mounted in an elevated position by structural members 38 across the upper end of which is disposed a plate 40 having a circular opening 42 defining the hopper inlet.

The dumping element of the apparatus 10 is constructed as a movable frame, indicated generally as 44, and comprised of a pair of elongated, laterally spaced arms 46, each having one end attached, as by means of keys (not shown) to the drive shaft 24. The other end of the arms 46 each contains an angularly offset foot 48 that cooperate to mount a plurality of rollers 50 journalled for rotation therein and forming a platform 52 for reception of a container 12 to be dumped.

As shown in FIG. 1, the frame 44 in its container-loading position is arranged such that the platform 52 is disposed closely adjacent the discharge end of the conveyor 16. A transverse beam 54 having a cushion pad 56 on its upper flange is desirably positioned to receive the frame feet 48 so as to locate the rollers 50 in longitudinally aligned relation with those on the conveyor in order to facilitate transfer of a powder-laden container 12 from the conveyor to the platform.

Vertically spaced from the foot 48 on each frame arm 44 is an integrally formed support element 56 that is angularly offset from the arm in parallel relation with the foot. The support elements 56 together with a transverse tie member 58 between the respective elements mount cradle members 60,62 and 64 having arcuately formed bearing surfaces that serve to secure a container 12 on the platform 52. Members 60 and 62 are fixedly attached to one of the elements 56 and to the tie member 58 respectively while member 64 is movably arranged on the element 56 as a clamp.

Figure 2:
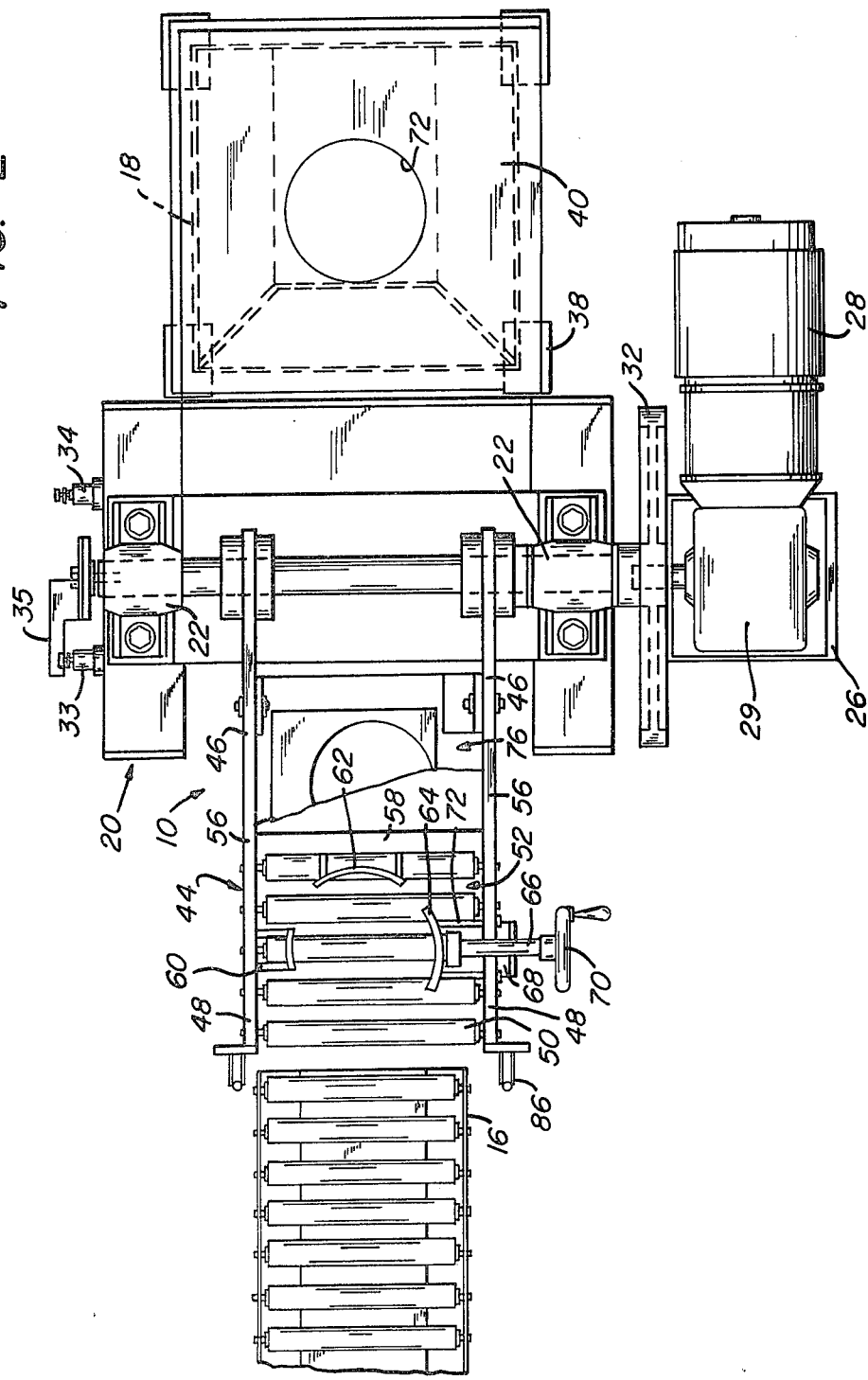
FIG. 2 is a plan view of the apparatus of FIG. 1.

As shown best in FIG. 2, the clamping member 64 is mounted on the support element 56 at the end of a screw 66 rotatable in a fixed nut 68 on the element by means of handwheel 70. A pair of oppositely spaced guide posts 72 attached to the member 64 are slidably received in openings 74 in the element 56 to maintain the member in proper disposition on the support element.

It should be readily apparent that transfer of a container 12 to the movable frame 44 is effected with the clamping member 64 in its retracted position by moving the container from the conveyor 14 onto the platform 52 until the container's exterior surface bears against the cradle members 60 and 62. Thereafter, by operation of handwheel 70 the clamping member 64 is brought into engagement with the exterior surface of the container thereby securing the container to the frame.

Figure 3:
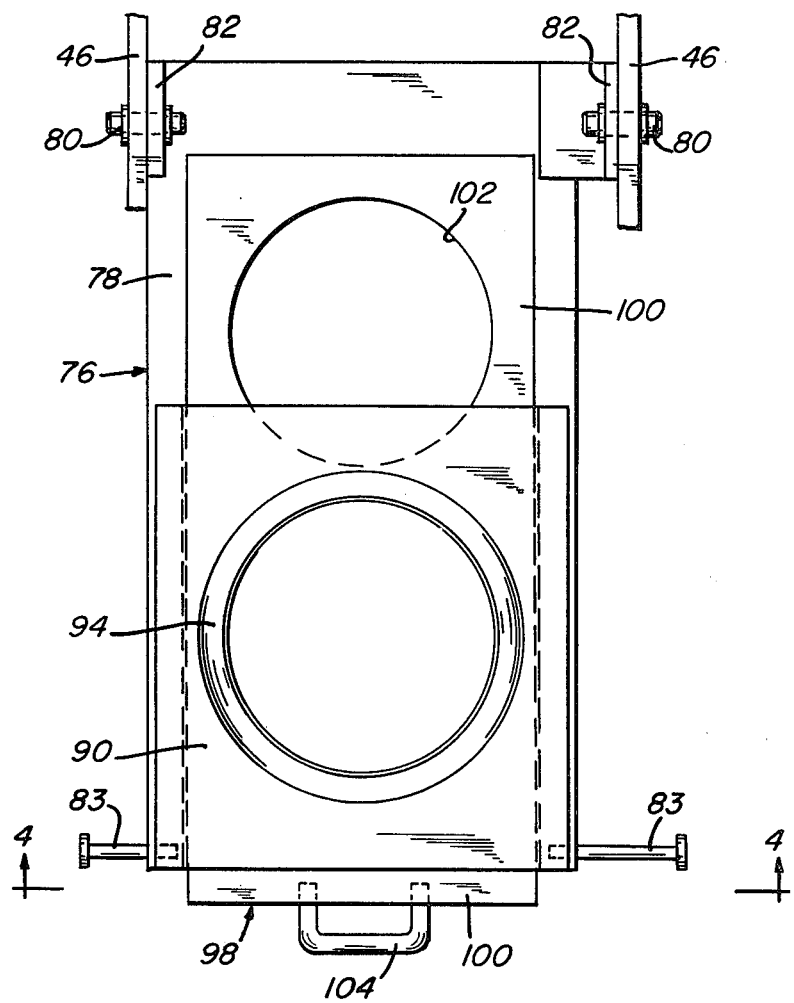
FIG. 3 is a plan view of the container closure according to the invention.
Figure 4:
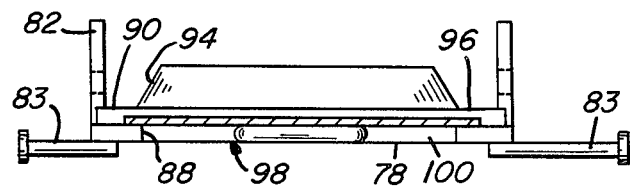
FIG. 4 is a view taken along line 4—4 of FIG. 3.

To be readied for dumping of the container's contents the cover thereof must be removed, either before or after transfer to the platform 52. Accordingly, in order to effectively close the container 12 during its inversion to the dumping position shown by the phantom lines in FIG. 1, the apparatus 10 provides a closure device, indicated generally as 76, which is adapted to extend across and be held in clamped relation with respect to the open end of the container 12. Closure device 76, as best shown in FIGS. 3 and 4, includes an elongate support plate 78 that is pivotally connected by pins 80 which extend through aligned openings in hinge ears 82 oppositely disposed at one end of the plate and in the respective frame arms 46. The support plate 78 is adapted to bear upon the open end of a container 12 seated on platform 52 and is provided with an opening 88 that overlies the open end of the container when the support plate is in the position shown in FIG. 1. At its other end the support plate 78 is provided with a pair of oppositely extending fixed pins 83 adapted to releasably receive the clamping hooks 84 of manually operated toggle clamps 86 mounted on the ends of the respective support elements 56 and operative to clamp the support plate with respect to the container.

On the upper surface of the support plate 78, over the opening 88, is mounted a slide guide 90 having a through-opening 92 encircled by a conically formed funnel 94. The slide guide 90 forms a guideway 96 for reception of a sliding gate plate 98 having a solid portion 100 impervious to the flow of powder and a through-opening 102 longitudinally spaced from the solid portion. Handle 104 fixed to the end of the gate plate 98 permits it to be moved with respect to the opening 92 in the support plate in order to selectively close the container 12 or to open it for dumping its contents as explained hereinafter.

The operation of the hereindisclosed apparatus is as follows. With an open-ended container 12 secured on the platform 52 as earlier described, the closure device 76 is pivoted to its position atop the container and secured thereto by engagement of the hooks 84 of clamping toggles 86 with the pins 83 on the support plate 78. Sliding gate plate 98 is at this time disposed in the slide guide 90 such that its impervious portion 100 is interposed between the opening 88 in the closure support plate 78 and the opening 92 in the slide guide thereby effectively closing the container 12. Motor 28 is energized to rotate the drive shaft 24, and with it the frame 44, until actuator arm 35 engages limit switch 34 deenergizing the motor. The position of limit switch 34 is such that the drive shaft 24 and frame 44 are caused to rotate through a sweep of about 180 degrees thereby moving the platform 52 and attached container from the loading position adjacent the transport conveyor 16 to a discharge position in which the platform and container are inverted as shown by the phantom lines in FIG. 1 and the funnel 94 on slide guide 90 is received in the opening 42 in plate 40 over the hopper 18. Thereafter, the sliding gate plate 98 is manually moved within the guide 90 to locate its through-opening 102 in communication with the openings 88 and 92 in the support plate and the slide guide respectively thereby effecting dumping of the contents of the container 12 into the hopper 18. When the container is emptied the sliding gate plate 98 is returned to its closing position in guide 90 and the motor 28 energized to return the frame 44 and container 12 to the loading position for replacement of the spent container with a fully loaded one by repetition of the aforementioned steps.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. Dumping apparatus comprising:
   a stationary base including oppositely spaced, upstanding structural members;
   pivot means on said base including a transverse shaft extending between said structural members and journalled for rotation on the upper ends thereof;
   a frame including spaced, parallel arms, one end of each being secured to the respective ends of said shaft, and a container-receiving platform extending between and attached to the other end of said arms;
   a container closure including an elongate plate pivotally secured at an end between the arms of said frame at a location intermediate the ends of said arms to dispose the free end of said plate substantially horizontally over a container supported on said platform, an opening in said plate for disposition over the top of said container when said plate is horizontally disposed thereover; and a slide plate slidably mounted on said elongate plate for selectively opening or closing said container; and
   drive means for pivoting said frame between a loading position for receiving said container and a discharge position in which said container is inverted.

2. Apparatus according to claim 1 including a shaft journalled for rotation on said base; means for driving said shaft alternately back and forth with respect to said base and in which said frame comprises a pair of laterally spaced arms, means for attaching said arms at one end to said shaft and means extending between the other end of said arms forming a container-receiving platform.

3. Apparatus according to claim 2 in which said container closure comprises an elongated support between said arms, means on one end of said support for pivotally attaching it to each of said arms, an opening at the other end of said arms arranged for disposition over the open end of said container when said closure is secured thereto, and means on said support for slidably guiding said slide plate.

4. Apparatus according to claim 3 in which said drive means comprises a drive gear attached to said shaft and a reversible motor having a pinion engageable with said drive gear.

5. Apparatus according to claim 1 including releasable latch means on said frame for securing said elongate plate to a container when the former is horizontally disposed over the latter.

* * * * *